United States Patent
Lin et al.

(10) Patent No.: US 8,264,612 B2
(45) Date of Patent: Sep. 11, 2012

(54) METHOD OF RASTER-SCAN SEARCH FOR MULTI-REGION ON-SCREEN DISPLAY AND SYSTEM USING THE SAME

(75) Inventors: Chia-Ching Lin, Taipei (TW); Fu-Chung Chi, Taipei (TW)

(73) Assignee: ALi Corporation, Taipei (TW)

( * ) Notice: Subject to any disclaimer, the term of this patent is extended or adjusted under 35 U.S.C. 154(b) by 562 days.

(21) Appl. No.: 12/556,867

(22) Filed: Sep. 10, 2009

(65) Prior Publication Data

US 2011/0058103 A1 Mar. 10, 2011

(51) Int. Cl.
*H04N 9/74* (2006.01)
(52) U.S. Cl. ......... 348/589; 348/584; 348/586; 348/588
(58) Field of Classification Search .................. 348/584, 348/586, 588, 589
See application file for complete search history.

(56) References Cited

U.S. PATENT DOCUMENTS

| | | | |
|---|---|---|---|
| 6,519,283 B1 * | 2/2003 | Cheney et al. ............ | 375/240.01 |
| 7,119,849 B2 * | 10/2006 | Yui et al. ...................... | 348/564 |
| 2002/0067433 A1 * | 6/2002 | Yui et al. ...................... | 348/588 |
| 2003/0179952 A1 * | 9/2003 | Hayashi et al. ............... | 382/284 |
| 2003/0231259 A1 * | 12/2003 | Yui et al. ...................... | 348/564 |
| 2005/0012863 A1 * | 1/2005 | Yui .............................. | 348/592 |
| 2005/0062754 A1 * | 3/2005 | Ku et al. ...................... | 345/592 |
| 2005/0237431 A1 * | 10/2005 | Yui .............................. | 348/592 |
| 2007/0222790 A1 * | 9/2007 | Winger ........................ | 345/592 |
| 2008/0273041 A1 * | 11/2008 | Chang et al. ................. | 345/522 |
| 2009/0046996 A1 * | 2/2009 | Harada ......................... | 386/124 |

* cited by examiner

*Primary Examiner* — Jefferey Harold
*Assistant Examiner* — Sam Huang
(74) *Attorney, Agent, or Firm* — J.C. Patents

(57) ABSTRACT

A method of raster-scan search for multi-region OSD and a system using the same are provided. The multi-region OSD is to be displayed on a screen after an alpha-blending of a mixer. The method includes at least following procedures. First, a global header search is executed in the first memory module for each or a portion of a plurality of search lines so as to determine a blending region and store header addresses of OSD regions in a second memory module. Next, whether there is a dummy region at the search line is determined. In addition, an alpha value for the dummy region, a dummy data of the dummy region and the OSD data of the OSD regions at the search line are transmitted to the mixer.

20 Claims, 12 Drawing Sheets

METHOD OF RASTER-SCAN SEARCH FOR MULTI-REGION ON-SCREEN DISPLAY AND SYSTEM USING THE SAME

BACKGROUND

1. Technology Field

The present invention relates to a method of raster-scan search for OSD (On-Screen Display, hereinafter abbreviated as "OSD") and to a system using the same, and more particularly to a method of raster-scan search for multi-region OSD and to a system using the same.

2. Description of Related Art

Currently, multimedia electronic devices such as portable multimedia players (PMP) and televisions (TV) are generally equipped with OSD capabilities. Referring to FIG. 1, FIG. 1 is an exemplary display for illustrating the OSD and a main image on a screen of a multimedia electronic device. Referring to FIG. 1, the main image is usually displayed on a background of a screen 110 when multi-region OSD (such as a region A 130, a region B 132, a region C 134, a region D 136 and a region E 138) are launched at any time in response to a request from a user. The main image could be, for example, a sports event, a movie, or an advertisement video. Besides, the region A 130, the region B 132, the region C 134, the region D 136 and the region E 138 may not be launched simultaneously and may contain different texts, graphics, or even video.

Usually, the OSD or the multi-region OSD are displayed on top of the main image, but, in some cases, the multi-region OSD may be displayed transparently along with the main image on the background if an alpha-blending technique is applied in the screen of the multimedia electronic device. However, if there are randomized sequence of the multi-region OSD to be displayed on the screen, four OSD regions on one layer to be displayed on the screen, or an unlimited number of OSD regions on multilayer to be displayed on the screen, dynamically determining blending positions of the multi-region OSD and accessing OSD data of the multi-region OSD in time would require massive memory bandwidth, high speed processing capability, and consequently consumes a large amount of power.

SUMMARY

According to exemplary embodiments consistent with the present invention, a method of raster-scan search for multi-region OSD and a system using the same are provided. The method of raster-scan search for multi-region OSD executes a global header search of OSD regions, determines whether there is a dummy region at a search line, and transmits OSD data of the OSD regions and dummy data of the dummy regions to a mixer for an alpha-blending processing so as to display the multi-region OSD and a main image on a screen. Accordingly, exemplary embodiments consistent with the present invention may reduce memory bandwidth for accessing OSD data, thereby enhancing performance of searching and accessing OSD data.

According to an exemplary embodiment consistent with the present invention, a method of raster-scan search for multi-region OSD is provided. The multi-region OSD is to be displayed on a screen after an alpha-blending of a mixer. The OSD headers and OSD data of a plurality of OSD regions are stored in a first memory module. The method includes at least following procedures. First, a global header search of the OSD regions is executed in the first memory module for each or a portion of a plurality of search lines so as to determine a blending region, and the first executed global header search of the OSD regions in the first memory module is used to determine a blending region. Next, whether there is a dummy region at a search line is determined. In addition, an alpha value for the dummy region, a dummy data of the dummy region and the OSD data of the h OSD regions at the search line are transmitted to the mixer, and the aforementioned parameter h is the number of the OSD regions at the search line.

According to an exemplary embodiment consistent with the present invention, in the method of raster-scan search for multi-region OSD, the OSD data of the h OSD regions at the search line is accessed according to the OSD headers of the h OSD regions at the search line, and the dummy region is calculated according the OSD headers of the h OSD regions at the search line.

According to an exemplary embodiment consistent with the present invention, a raster-scan search system for multi-region OSD is provided. The multi-region OSD is to be displayed on a screen after an alpha-blending of a mixer. Besides, OSD headers and OSD data of a plurality of OSD regions are stored in a first memory module, and the mixer executes the alpha-blending of the OSD data from the raster-scan search system for the multi-region OSD and a main image data from a main image processing unit. The raster-scan search system for the multi-region OSD includes at least a global header search module, a dummy region determination module, and a blending region data output module. The global header search module is configured for executing a global header search in the first memory module for each or a portion of a plurality of search lines, and the global header search of the OSD regions in the first search line is used to determine a blending region. Besides, the dummy region determination module is configured for determining whether there is a dummy region at a search line. Furthermore, the blending region data output module is configured for transmitting an alpha value for the dummy region, dummy data of the dummy region, and the OSD data of the h OSD regions at the search line to the mixer, and the aforementioned parameter h is the number of the OSD regions at the search line. In addition, the raster-scan search system also includes a processor configured to execute and coordinate the global header search module, the dummy region determination module, and the blending region data output module.

According to an exemplary embodiment consistent with the present invention, the blending region data output module of the raster-scan search system includes an OSD data fetcher module configured for accessing the OSD data of the OSD regions at the search line from the first memory module. The OSD data of the h OSD regions at the search line is accessed according to the OSD headers of the h OSD regions at the search line, and the dummy region is calculated according the OSD headers of the h OSD regions at the search line.

According to exemplary embodiments consistent with the present invention, a method of raster-scan search for multi-region OSD and a system using the same are provided. The method of raster-scan search for multi-region OSD executes a global header search of OSD regions in a memory module, determines whether there is a dummy region at the search line, and transmits OSD data of the OSD regions, an alpha value for the dummy region and dummy data of the dummy region to a mixer for a further alpha-blending processing so as to display the multi-region OSD along with a main image on a screen. Accordingly, exemplary embodiments of the present invention may reduce memory bandwidth for accessing OSD data from the memory module, thereby enhancing performance of searching and accessing OSD data of the OSD regions in the memory module.

In order to make the features and advantages of the present invention comprehensible, exemplary embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF EMBODIMENTS

Figure 1:
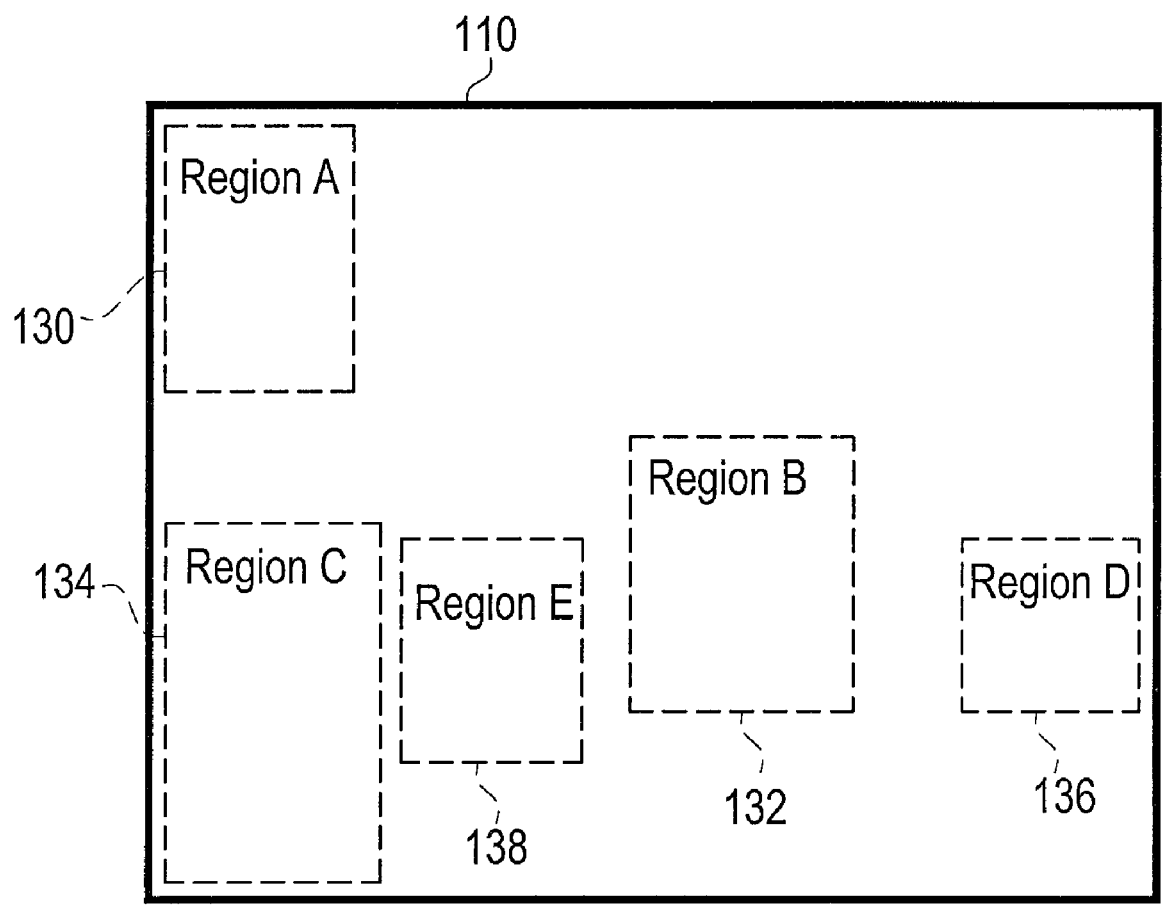
FIG. 1 is a schematic diagram for illustrating the OSD and a main image on a screen of a multimedia electronic device.

Reference will now be made in detail to the exemplary embodiments of the invention, examples of which are illustrated in the accompanying drawings. Wherever possible, the same reference numbers are used in the drawings and the description to refer to the same or like parts.

Figure 2:
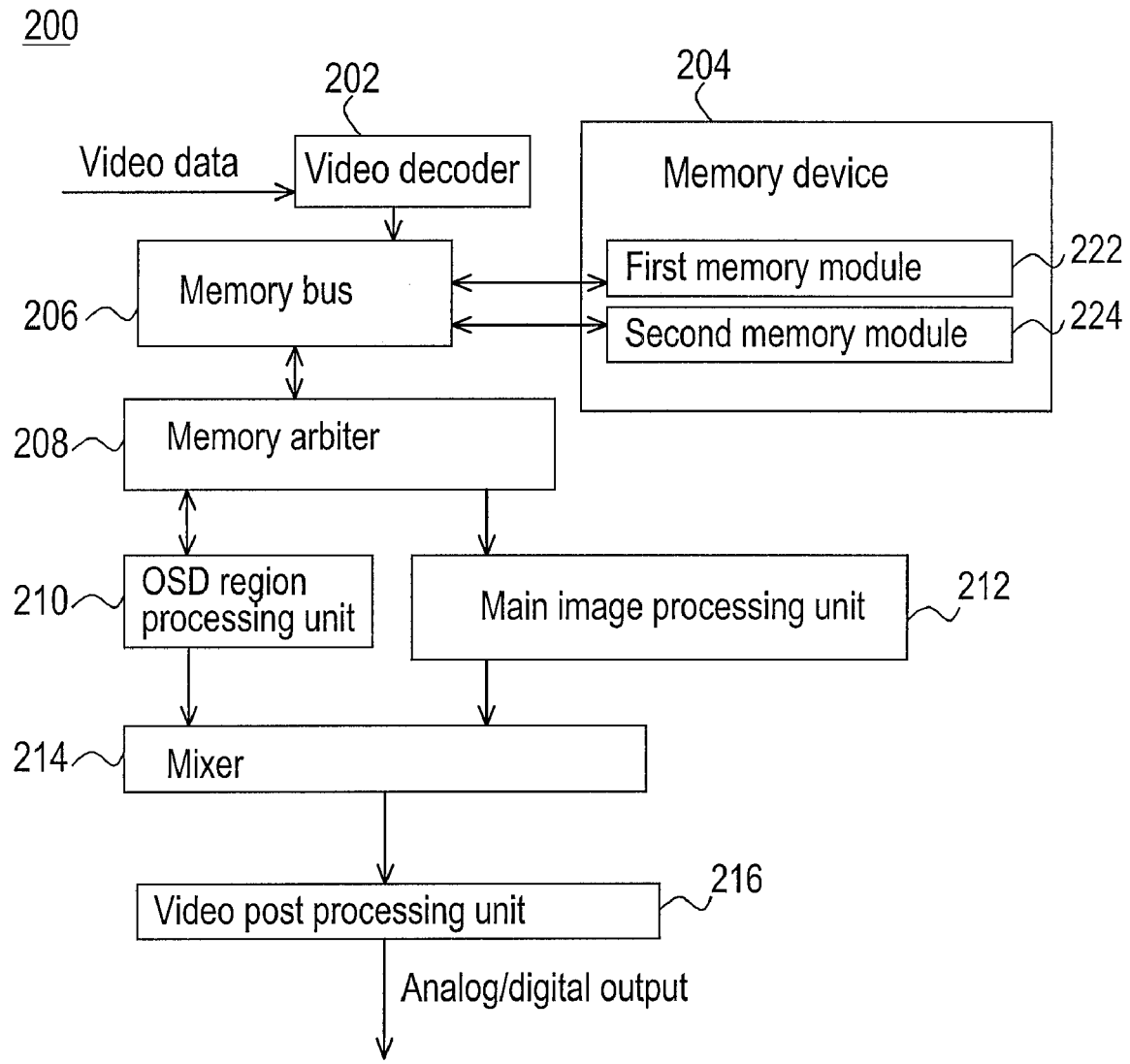
FIG. 2 is a block diagram illustrating a display engine of a multimedia electronic device according to an exemplary embodiment.

FIG. 2 is a block diagram illustrating a display engine 200 of a multimedia electronic device according to an exemplary embodiment. Referring to FIG. 2, in the present embodiment, the display engine 200 includes a video decoder 202, a memory device 204, a memory bus 206, a memory arbiter 208, an OSD region procession unit 210, a main image processing unit 212, a mixer 214 and a video post processing unit 216.

Referring to FIG. 2, in the present exemplary embodiment, the video decoder 202 of the display engine 200 receives video data from an input source (not shown) such as a demodulator of a television broadcast receiver, a content server on the Internet, or an external memory card containing video data. It should be noted that, normally, the video data such as multimedia content may also contain audio data but relevant processing details of the audio data is intended to be omitted herein and thereafter since processing of the audio data is not a main focus of the present invention. In the present exemplary embodiment, the video decoder 202 stores the video data into the memory device 204 for further processing. Besides, the memory device 204 may include at least a first memory module 222 and a second memory module 224. For example, the first memory module 222 may be a Dynamic Random Access Memory (DRAM) and the second memory module 224 may be a Static Random Access Memory (SRAM). However, the present invention is not limited thereto, and in other exemplary embodiments, the memory device 204 may include more than two memory modules and may include other memory types than DRAM and SRAM. For example, the memory device 204 may include other memory modules such as Flash memory, optical memory, magnetic memory or other electrically programmed memory. In addition, in other exemplary embodiments, the first memory module 222 and the second memory module 224 may be integrated as one memory device or implemented in an integrated memory device.

In addition to the received video data, in the present exemplary embodiment, the memory device 204 also stores the OSD data of a plurality of OSD regions. For example, the OSD data of the OSD regions (or the multi-region OSD) is stored in the first memory module 222, and the received video data is stored in the second memory module 224. The OSD region processing unit 210 and the main image processing unit 212 respectively access the OSD data and the received video data from the memory device 204 via the memory bus 206. Besides, the OSD region processing unit 210 extracts the OSD data corresponding to selected OSD regions in response to requests of a user. On the other hand, the main image processing unit 212 extracts main image data from the received video data. Furthermore, the mixer 214 receives the OSD data from the OSD region processing unit 210 and the main image data of the main image from the main image processing unit 212. The main image data from the main image processing unit 212 may include, but not limited to, image data from a deinterlacer (not shown), subtitle data from a subtitle decoder (not shown), cursor data from a cursor processing unit (not shown) and graphic data from a graphic data fetcher module (not shown). In addition, the mixer 214 may apply an alpha-blending processing on the OSD data and the main image data of the main image, and outputs blending video data to the video post processing unit 216 for further processing.

It is to be noted that the alpha-blending processing applied by the mixer 214 refers to a convex combination of two or more colors and allows a transparency effects in graphics. Usually, an alpha value in the color code ranging from 0.0 to 1.0 is supplied to the mixer 214 along with the OSD data or with the video data. An alpha value of "0.0" represents a fully transparent color, and an alpha value of "1.0" represents a fully opaque color. In the present exemplary embodiments and other exemplary embodiments of the present invention thereafter, the mixer 214 also receives the OSD data from OSD region processing unit 210 with the alpha value for the dummy period. Then, the mixer 214 may replace the received alpha value for the dummy period with a new alpha value according to the main image data during the alpha-blending so as to output the blended video with the transparency effects in graphics to the video post processing unit 216. In the present exemplary embodiment of the present invention, the blended video may be directly output to a screen for display. However, in other exemplary embodiments of the present invention, the blended video may be output to an interface coupled to an external display device or a plurality of external display devices for further displaying the blended video. In addition, the OSD region processing unit 210 will be described in more detail below.

Figure 3:
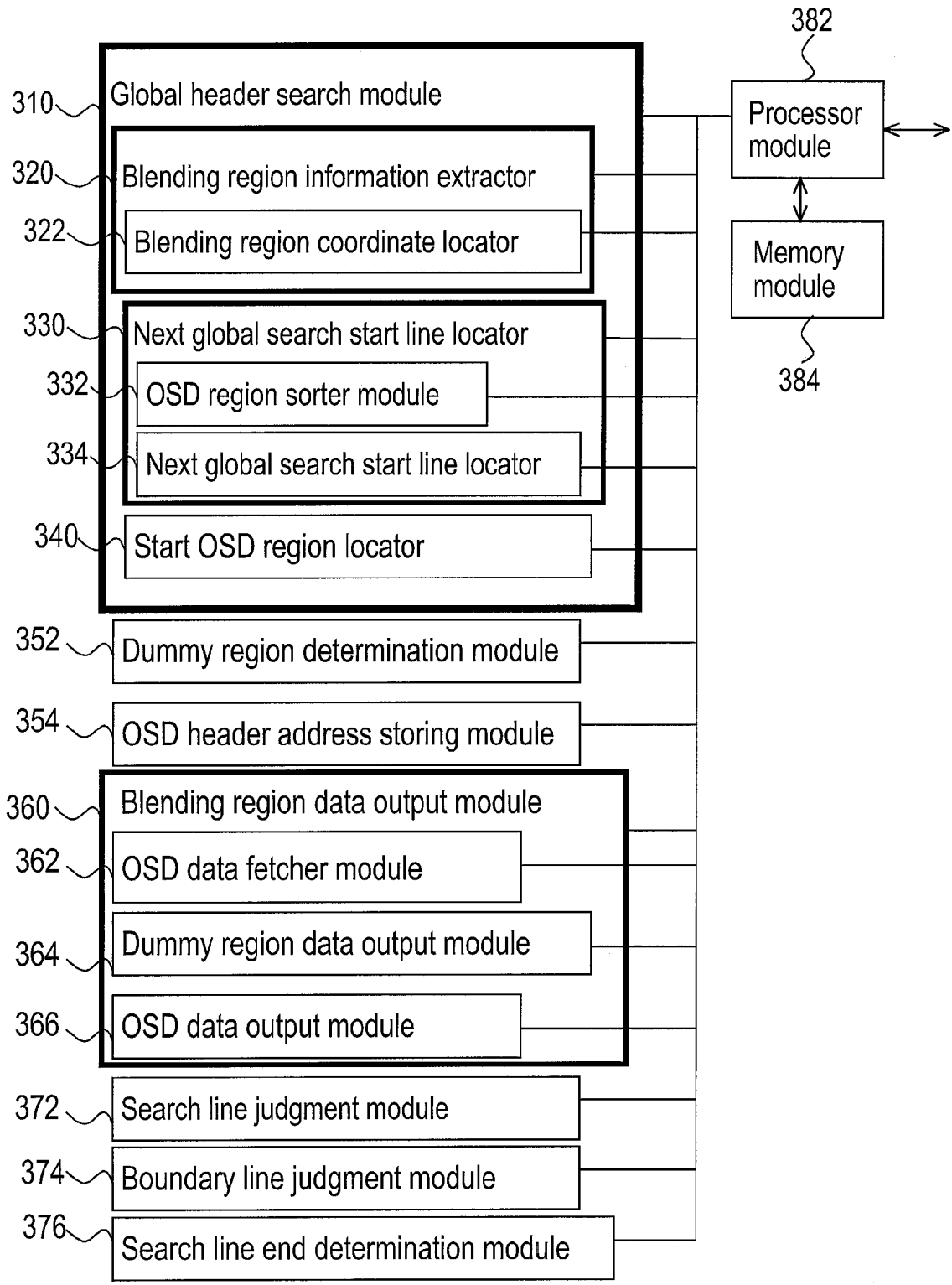
FIG. 3 is a block diagram illustrating an OSD processing unit of a multimedia electronic device according to an exemplary embodiment.

The present invention provides a method of raster-scan search for multi-region OSD. FIG. 3 is a block diagram illustrating the OSD region processing unit 210 of a multimedia electronic device according to an exemplary embodiment. Referring to FIG. 3, in the present exemplary embodiment, the OSD region processing unit 210 may include at least a global header search module 310, a dummy region determination module 352, an OSD header address storing module 354 and a blending region data output module 360. In other embodiments, the OSD processing unit 210 may include other modules, and those other modules will be further described in detail in corresponding paragraphs below.

Referring to FIG. 3, in the present exemplary embodiment, the global header search module 310 is configured for executing a global header search of the OSD regions in the first memory module 222 of the memory device 204, and the global header search may be executed on each or a portion of a plurality of search lines. Besides, in the present exemplary embodiment, and in particular, the global header search conducted by the global header search module 310 applies a raster-scan search of the OSD regions in the first memory module 222. Furthermore, the OSD regions may be launched at any time on the screen for display in response to the requests of the user. For example, referring to FIG. 1, the region A 130 may represent an OSD region for an audio control menu, and may be appeared on the screen 110 when the user presses a control key which triggers the audio control menu to be displayed on the screen 110. Similarly, referring to FIG. 1, the region B 132, the region C 134, the region D 136 and the region D 138 may respectively represent different OSD regions for menus of other functionalities or even a sub-screen (i.e. a screen displaying video with a display region smaller than the main image), and these OSD regions may or may not be launched simultaneously on the screen 110. In other words, there may be dynamical and randomized sequence of the multi-region OSD to be displayed on the screen 110 in response to the requests of the user.

Referring to FIG. 3, the dummy region determination module 352 is configured for determining whether there is a dummy region at the search line. Besides, the OSD header address storing module 354 is configured for storing header addresses of the OSD regions into the first memory device 222. Moreover, the blending region data output module 360 is configured for transmitting the alpha value for the dummy region, transmitting the dummy data of the dummy region, and transmitting the OSD data of the OSD regions to the mixer 214 Here, the term "blending region" refers to a graphical region in which the OSD regions and the main image are overlapped. It is to be noted that the blending region may be smaller than the main image in some cases. Therefore, in those cases, it is required to determine the blending region. After main modules of the OSD processing unit 210 are introduced, the method of raster-scan search for the multi-region OSD according to several exemplary embodiments will be described in detail below.

Figure 4:
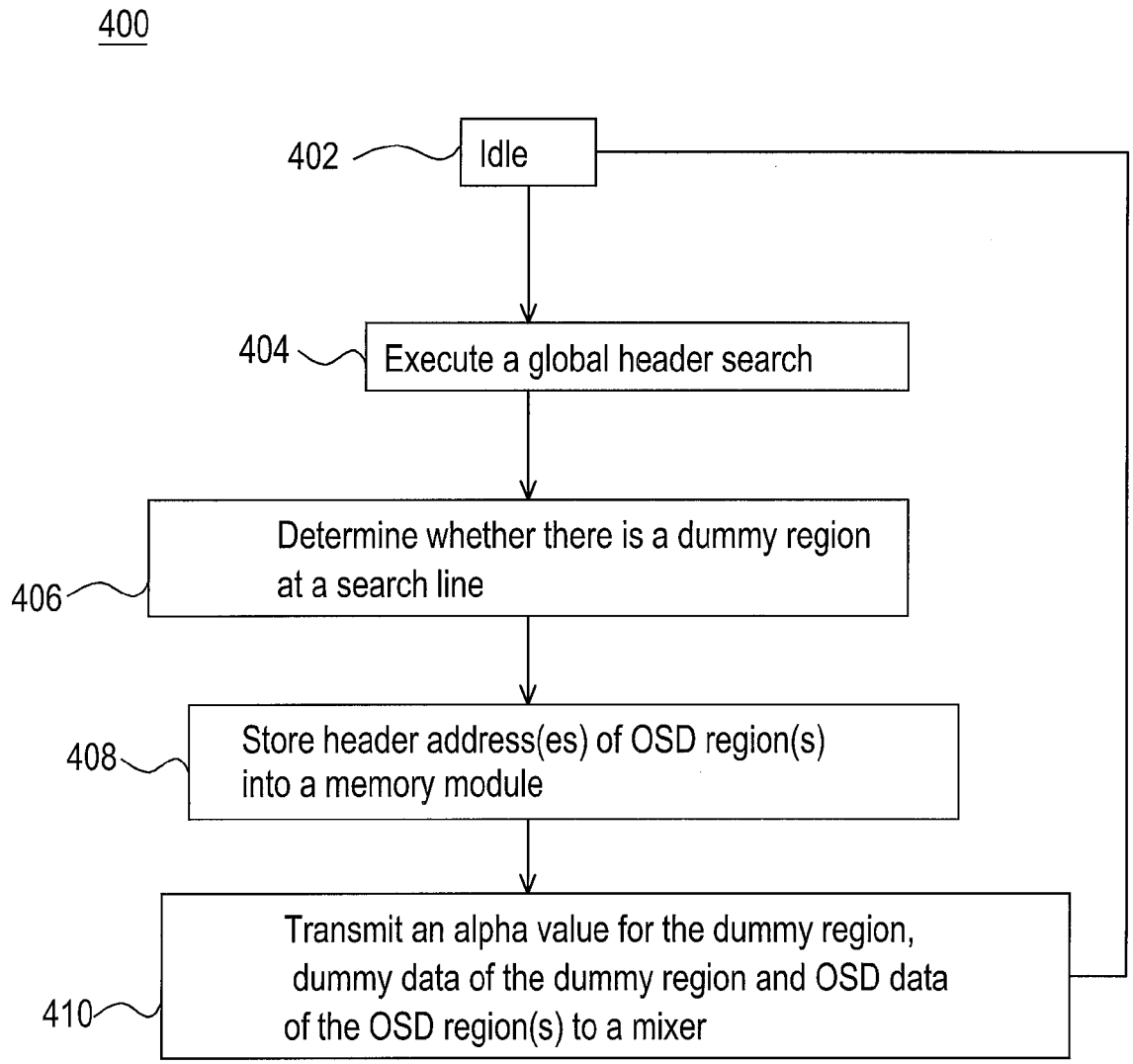
FIG. 4 is a flowchart illustrating a method of raster-scan search for multi-region OSD according to an exemplary embodiment.

FIG. 4 is a flowchart illustrating a method of raster-scan search for multi-region OSD according to an exemplary embodiment. Referring to FIG. 2 and FIG. 4, in the present exemplary embodiment, the multi-region OSD is to be displayed on the screen 110 after the alpha-blending processing of the mixer 214. Besides, OSD headers and the OSD data of a plurality of OSD regions are stored in the memory device 204. To be more specific, in the present exemplary embodiment, the OSD data of the OSD regions are stored in the first memory module 222 of the memory device 204. In addition, the OSD data of each of the OSD regions stored in the first memory module 222 of the memory device 204 may include, but not limited to, a header address of a next OSD region, a display width of the OSD region, a start y coordinate of the OSD region, a start x coordinate of the OSD region and a display height of the OSD region.

Referring to FIG. 2, FIG. 3 and FIG. 4, in the present exemplary embodiment, a process 400 of a method for the raster-scan search for the multi-region OSD initiates from a process block 402. At the process block 402, the OSD region processing unit 210 stays in an idle state. There is a control mechanism in the display engine 200 used for determining whether the OSD region processing unit 210 is activated. If it is determined to have the OSD region processing unit 210 activated at the process block 402, the display engine 200 sends a control signal to the OSD region processing unit 210 for triggering an activation of such a finite state machine. However, the present invention is not limited thereto, and the OSD region processing unit 210 may be activated by other control mechanisms associated with the display engine 200 as well. After the process block 402, the process 400 may proceed to the process block 404.

At the process block 404, the global header search of the OSD regions is executed in the first memory module 222 of the memory device 204, and the global header search may be executed at each or a portion of the search lines. Besides, a first executed global header search of the OSD regions in the first memory module 222 is used to determine the blending region. After the process block 404, the process 400 may proceed to the process block 406. At the process block 406, whether there is a dummy region at the search line of the global header search is determined. After the process block 406, the process 400 may proceed to the process block 408.

At the process block 408, header addresses of a portion of the OSD regions in the memory device 204 are stored into the second memory module 224 of the memory device 204. To be more specific, in the present exemplary embodiment, the header addresses of a portion of the OSD regions in the first memory module 222 are stored into the second memory module 224 of the memory device 204, and the second memory module 224 may have an easier or a more efficient memory access capability than the first memory module 222. Moreover, in the present embodiment, v OSD header addresses of the v OSD regions at the search line are stored into the second memory module 224 of the memory device 204. The aforementioned parameter v is a positive integer less than or equal to the number of the OSD regions at the search line and depended on the size of a buffer. After the process block 408, the process 400 may proceed to the process block 410.

At the process block 410, the alpha value for the dummy region, the dummy data of the dummy region and the OSD data of the OSD regions are transmitted to the mixer 214 for the alpha-blending, and the alpha value in the present exemplary embodiment is configured to be zero. As mentioned previously, the mixer 214 may replace the alpha value for the dummy region with other alpha value according to the video data received from the main image processing unit 212. Besides, in the present embodiment, the OSD data of the h OSD regions at the search line is transmitted to the mixer 214, and the aforementioned parameter h is the number of the OSD regions at the search line. Moreover, the OSD data of the h OSD regions at the search line is accessed according to the OSD headers of the h OSD regions at the search line, and the dummy period is calculated according to the OSD headers of the h OSD regions at the search line. Furthermore, the OSD data of the v OSD regions at the search line is accessed according to the v OSD header addresses of the v OSD regions stored in the second memory module 224, and the v OSD header addresses of the v OSD regions at the search line are stored into the second memory module 224 in an order identical to an order of the v OSD regions at the search line.

At the process block 410, when a dummy period at the search line is equal to a true value, the dummy data of the dummy region and the alpha value are transmitted to the mixer 214. Here, the dumpy period is used to present whether a current pixel point is on the dummy region, and the alpha value is set to be zero in this case. In addition, when a dummy period at the search line is equal to a false value, the OSD data of the OSD region is transmitted to the mixer 214.

After the process block 410, the process 400 may return back to the idle state at the process block 402. To be more specific, at the process block 408, the process 400 may continue to execute extra (v−1) times of the global header search so as to find the (v−1) OSD header addresses of the (v−1) OSD regions at the search line to be stored into the second memory module 224. In addition, at the process block 410, the process 400 may also continue to execute (h−v) times of the global header search so as to access the OSD data of (h−v) OSD regions at the search line according to the (h−v) OSD regions whose OSD header addresses are not previously stored in the second memory module 224. After the description of the process 400, the method for the raster-scan search for the multi-region OSD may include other procedures which will be described in detail below.

Figure 5:
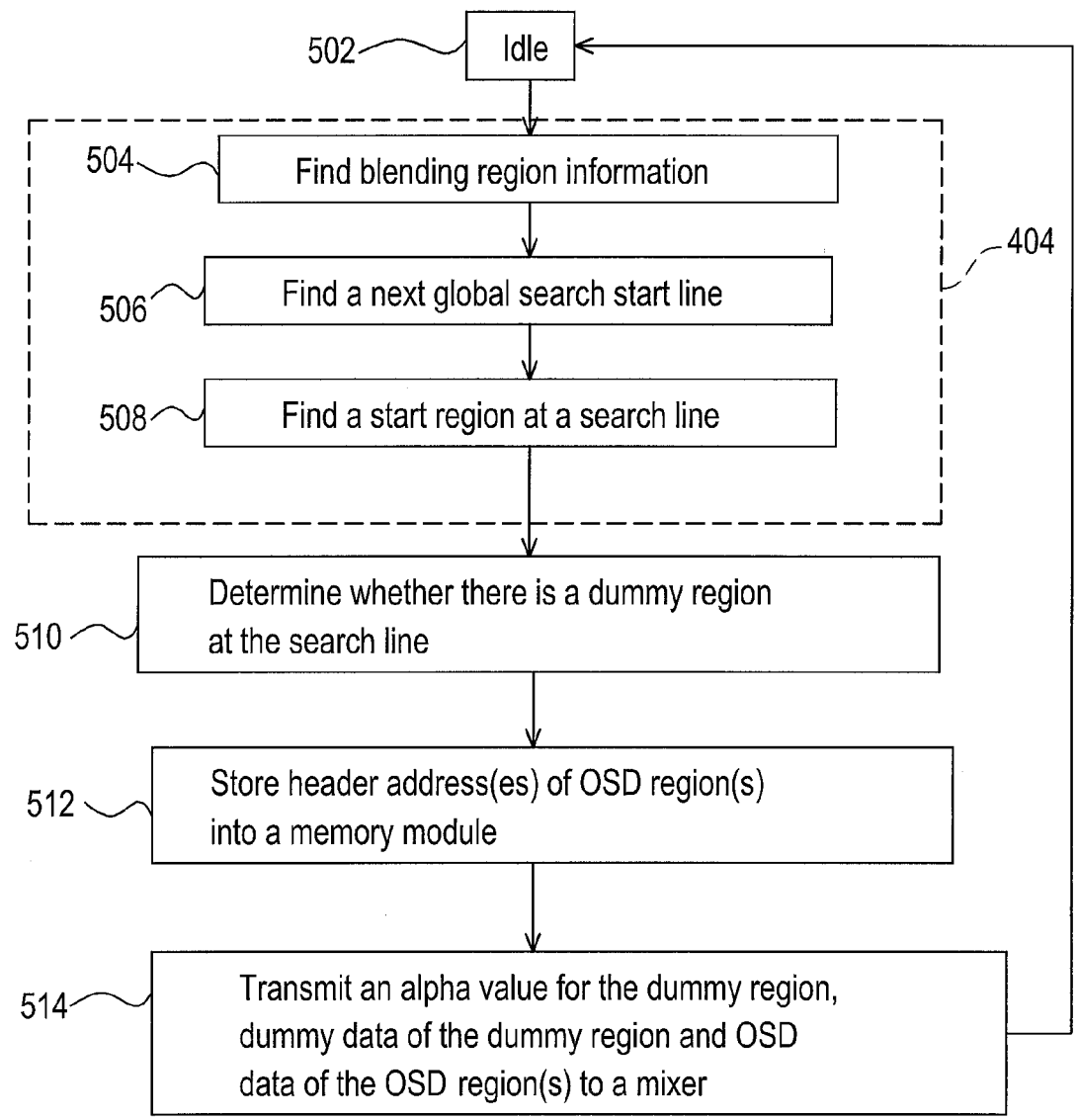
FIG. 5 is a flowchart illustrating a method of raster-scan search for multi-region OSD according to another exemplary embodiment.

FIG. 5 is a flowchart illustrating a method of raster-scan search for multi-region OSD according to another exemplary embodiment. Referring to FIG. 5, in the present exemplary embodiment, a process 500 for the method of the raster-scan search for the multi-region OSD is similar to the process 400 except following descriptions.

Similar to the process 400, the process 500 initiates from the process block 502, the OSD region processing unit 210 at the process 500 stays in the idle state. There is a control mechanism in the display engine 200 used for determining whether the OSD region processing unit 210 is activated. If it is determined to have the OSD region processing unit 210 activated at the process block 502, the display engine 200 sends a control signal to the OSD region processing unit 210 for triggering an activation of such a finite state machine. However, the present invention is not limited thereto, and the OSD region processing unit 210 may be activated by other control mechanisms associated with the display engine 200 as well. Next, the process 500 proceeds from the process block 502 to the process block 504.

The process block 504 in FIG. 5 is similar to the process block 404 in FIG. 4, and further comprises the process blocks 504, 506, and 508. Besides, the process blocks 504, 506, and 508 are just executed when the first global header search is applied therein. At the process block 504, blending region information is found. The blending region information may include blending region positions, the OSD regions of the blending region and the header addresses of the OSD regions. Besides, at the process block 504, the process 500 may also conduct following procedures such as searching a start x position, a start y position, an end x position, and an end y position of the blending region and determining whether there is the dummy region at the search line. It is to be noted that the blending region may include more than an OSD region, and the blending region may be smaller than the main image. Furthermore, in the present exemplary embodiment, the number of the OSD regions in the current search line may be determined by using a global line counter, and the dummy period in the current search line may be determined by using a global pixel counter. In addition, it is just required to search the start x position, the start y position, the end x position, and the end y position of the blending region in a first executed global header search in the first memory module 222 of the memory device 204. After the process block 504, the process 500 may proceed to the process block 506.

At the process block 506, a next global search start line is found. More specifically, in the present exemplary embodiment, the process 500 may further conduct following procedures at the process block 506 such as sorting start y positions and end y positions of the OSD regions, and finding the next global search start line according to the sorted start y positions and end y positions of the OSD regions. Besides, in the other exemplary embodiments, the sorting of the OSD regions may be implemented by comparing start x positions and end x positions of the OSD regions in a horizontal direction. After the process block 506, the process 500 may proceed to the process block 508.

At the process block 508, a start OSD region at the search line is found. After the process block 508, the process 500 may proceed to the process block 510. The process block 510 of the process 500 is similar to the process block 406 of the process 400 and may be referred to the process block 406. After the process block 510, the process 500 may proceed to the process block 512.

The process block 512 of the process 500 is similar to the process block 408 of the process 400 except that the process 500 may further conduct following procedures at the process block 510 such as storing the header addresses of a portion of the OSD regions into the second memory module 224 of the memory device 204 in an order identical to an order of the sorted OSD regions obtained at the process block 506. In addition, in the present exemplary embodiment, a region match judgment strategy may be applied for determining whether a global line count is between the OSD regions so as to abandon useless regions or just a useless region. After the process block 512, the process 500 may proceed to the process block 514.

The process block 514 of the process 500 is similar to the process block 410 of the process 400 except that the process 500 may further conduct following procedures at the process block 510. First, at the process block 510, the OSD data of the OSD regions is fetched from the first memory module 222 of the memory device 204, and the OSD data is fetched in an order identical to how the header addresses of the OSD regions are stored into the second memory module 224 of the memory device 204. In other words, the OSD data is fetched from the first memory module 222 of the memory device 204 in a sequential order identical to the order how the header addresses of the OSD regions are stored into the second memory module 224. Secondly, the alpha value for the dummy region and the dummy data of the dummy region are transmitted to the mixer 214, and the alpha value is configured to be zero before being transmitted to the mixer 214. In addition, the OSD data of the OSD regions is also transmitted to the mixer 214, and the OSD data is transmitted to the mixer 214 in an order identical to how the header addresses of the OSD regions are stored in the second memory module 224 of the memory device 204. In other words, the OSD data is transmitted to the mixer 214 in a sequential order identical to the order of the header addresses of the OSD regions stored into the second memory module 224 obtained at the process block 506. After the process block 514, the process 500 may return back to the process block 502. In addition to the aforementioned process 400 and process 500, another process for the method of raster-scan search for multi-region OSD will be provided in detail below.

Figure 6:
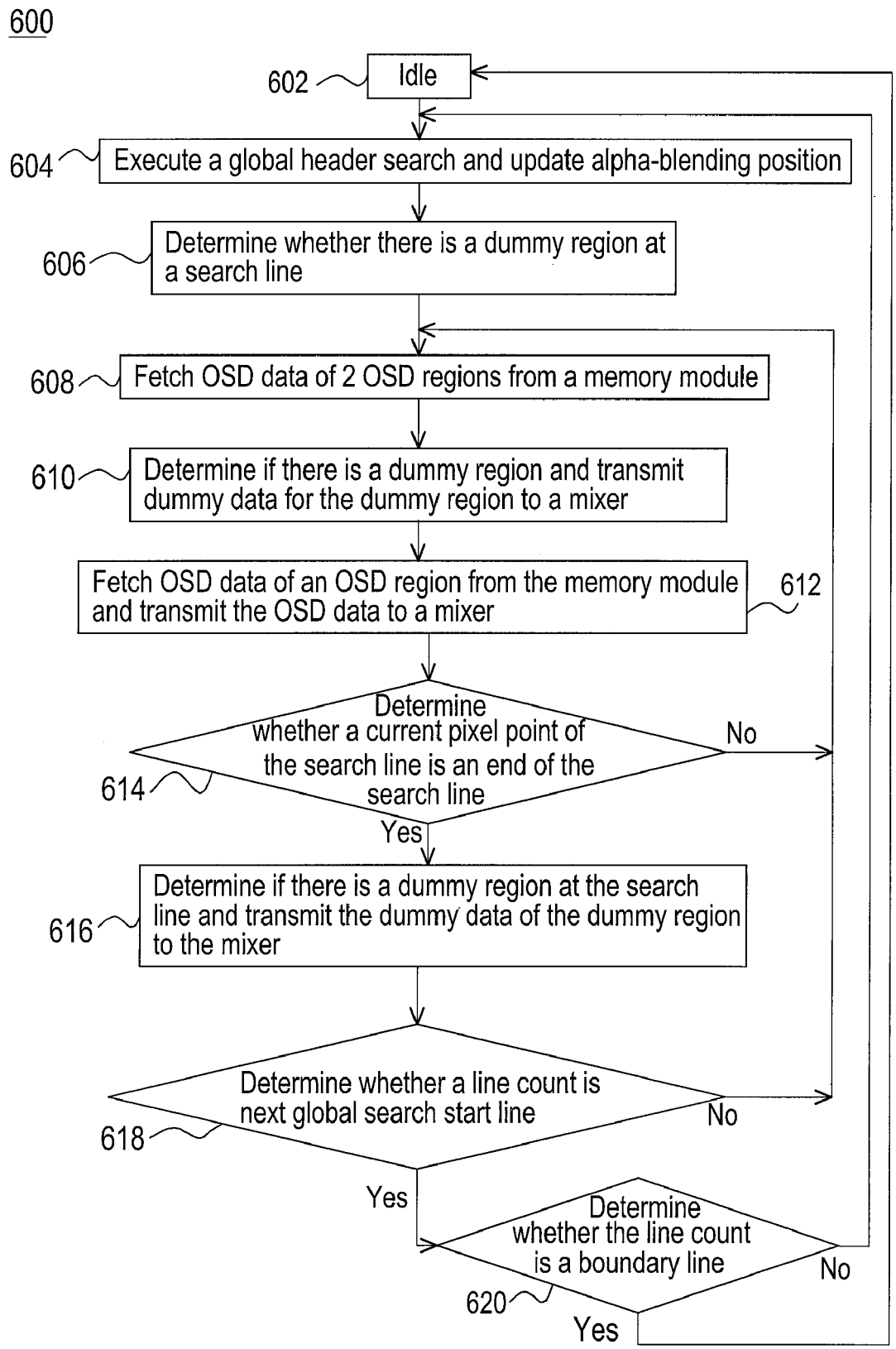
FIG. 6 is a flowchart illustrating a method of raster-scan search for multi-region OSD according to another exemplary embodiment.

FIG. 6 is a flowchart illustrating a method of raster-scan search for multi-region OSD according to another exemplary embodiment. Referring to FIG. 6, similar to the process 500, the process 600 initiates from the process block 602, the OSD region processing unit 210 at the process 600 stays in the idle state. There is a control mechanism in the display engine 200 used for determining whether the OSD region processing unit 210 is activated. If it is determined to have the OSD region processing unit 210 activated at the process block 602, the display engine 200 sends a control signal to the OSD region processing unit 210 for triggering an activation of such a finite state machine. However, the present invention is not limited thereto, and the OSD region processing unit 210 may be activated by other control mechanisms associated with the display engine 200 as well. Next, the process 600 proceeds from the process block 602 to the process block 604.

At the process block 604, the global header search is executed in the first memory module 222 of the memory device 204, and alpha-blending positions are updated to the mixer 214. The alpha-blending positions are the aforementioned blending region position. Besides, the alpha-blending positions may include, but not limited to, the start x position, the start y position, the end x position and the end y position of the blending region. It is to be noted that, in the present exemplary embodiment, the step of executing the global header search in the first memory module 222 of the memory device 204 and the step of updating the alpha-blending positions to the mixer 214 may be executed in parallel. However, it is just required to update the alpha-blending positions to the mixer 214 in a first executed global header search in the first memory module 222 of the memory device 204. After the process block 604, the process 600 may proceed to the process block 606.

The process block 606 is similar to the process block 406 of the process 400 and may be referred to the process block 406. After the process block 606, the process 600 may proceed to the process block 608. At the process block 608, the OSD data of two adjacent OSD regions are fetched from the first memory module 222 of the memory device 204. The OSD data of two adjacent OSD regions are fetched so as to further determine whether there is a dummy region at the search line at the process block 610. After the process block 608, the process 600 may proceed to process block 610.

At the process block 610, whether there is a dummy region at the search line is determined. The determination on whether there is a dummy region at the search line may include following procedures. First, at least two OSD header addresses of the OSD regions stored in the second memory module 224 is read, and an order of reading the two OSD header addresses is identical to an order how the two OSD header addresses are stored into the second memory module 224. Secondly, the OSD data of the two OSD regions according to the two read OSD header addresses is fetched. Thirdly, whether there is the dummy region at the search line according to the two read OSD headers of the OSD regions. Besides, the alpha value for the dummy region and the dummy data of the dummy region are also transmitted to the mixer 214. After the process block 610, the process 600 may proceed to process block 612.

At the process block 612, the OSD data of one of the OSD regions is fetched from the first memory module 222 of the memory device 204 and is also transmitted to the mixer 214. After the process block 612, the process 600 may proceed to process block 614. At the process block 614, whether a current pixel position to be processed is an end of the search line is determined. The current pixel position to be processed currently is updated when the current pixel position has been processed and the data (OSD data or dummy data) of the current pixel position is transmitted to the mixer 241. If the current pixel position at the search line is determined not the end of the search line, then after the process block 614, the process 600 returns back to the process block 608 for fetching the OSD data of at least two OSD regions from the memory device 204. Otherwise, if the current pixel position at the search line is the end of the search line, then after the process block 614, the process 600 may proceed to process block 616 for determining whether there is a dummy region at the search line. The process block 616 is similar to the process block 610 and may be referred to the process block 610. After the process block 616, the process 600 may proceed to process block 618.

At the process block 618, whether a current line count equal to a next global start line is determined, and the current line count is updated when the current line has been processed. In other words, at the process block 618, the procedure conducted at the process block 618 is used to determine whether the current search line of the global header search is the next global search start line. If the current search line of the global header search is determined to be the next global search start line, then after the process block 618, the process 600 may proceed to process block 620. If the current search line of the global header search is determined not to be the next global search start line, then after the process block 618, the process 600 may return back to the process block 608 for fetching the OSD data of the two OSD regions from the first memory module 222 of the memory device 204. At the process block 620, whether a current line count is a boundary line is determined. In other words, whether the current search line of the global header search is a boundary line is determined. If the current search line of the global header search is determined to be the boundary line, then after the process block 620, the process 600 may return back to the idle state at the process block 602. Otherwise, if the current search line of the global header search is determined to be not the boundary line, then after the process block 620, the process 600 may return back to the process block 604 for executing the global header search.

In addition to the aforementioned processes 400, 500 and 600 for the method of raster-scan search for the multi-region OSD, in another exemplary embodiment, the process block 512 may be conducted in a different way. Details of such different way of conducting the process block will be described below in detail referring to FIG. 7.

Figure 7A:
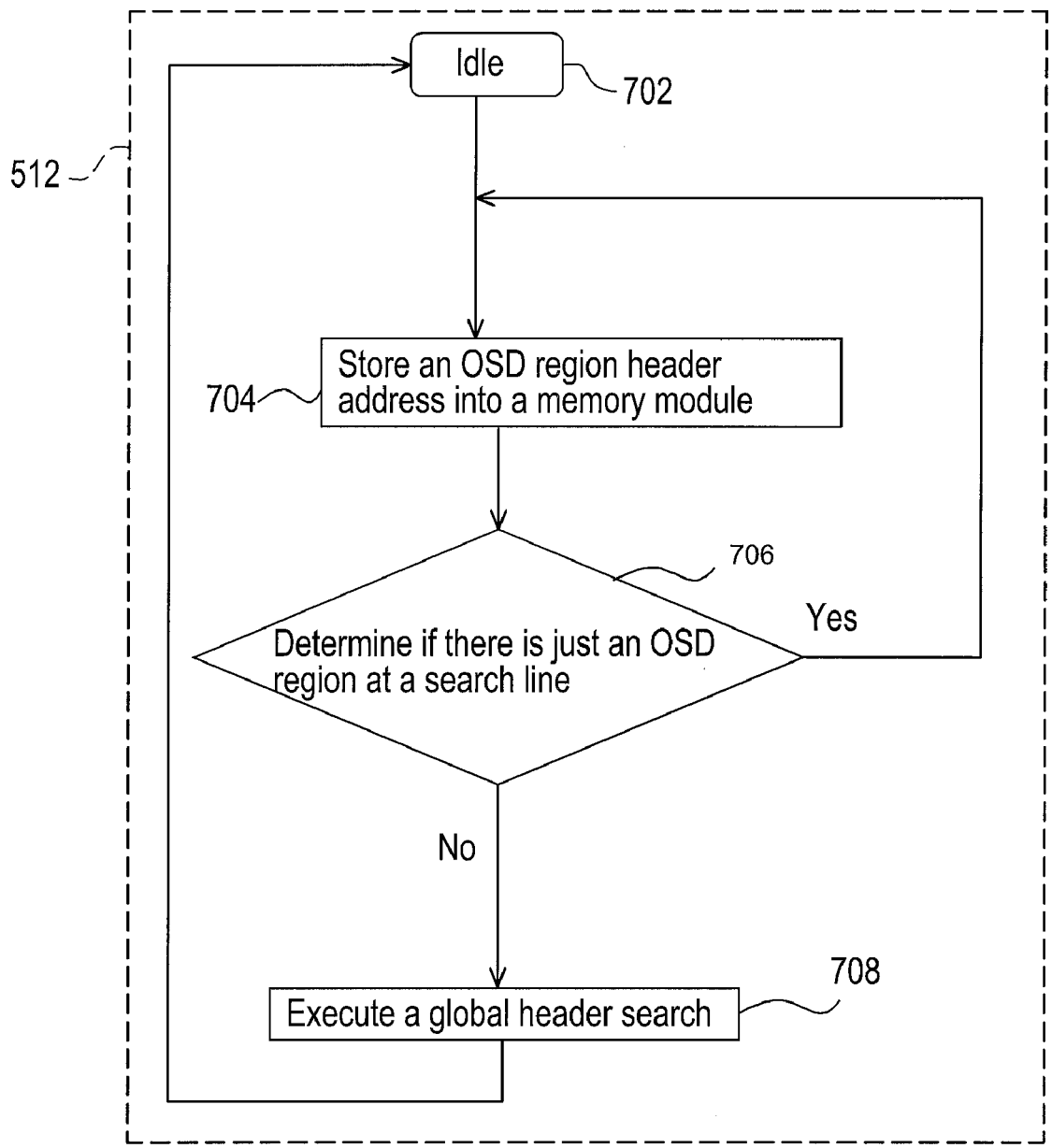
FIG. 7A is a flowchart illustrating a process of storing header addresses of a portion of the OSD regions into a memory module according to an exemplary embodiment.

FIG. 7A is a flowchart illustrating a process of storing header addresses of a portion of the OSD regions into a memory module according to an exemplary embodiment. In other words, FIG. 7 is a sub-process of the process 500 and illustrates the process block 512 in more detail. Initially, the process 700 initiates at process block 702 and stays in an idle state. Then, the process 700 proceeds to process block 704. At the process block 704, a header address of an OSD region is stored into the second memory module 224 of the memory device 204. If it is a first time of storing a header address of an OSD region is into the second memory module 224, then the OSD region is a start OSD region. After the process block 704, the process 700 may proceed to process block 706. At the process block 706, whether there is just one OSD region at the search line is determined. If there is just one OSD region at the search line, then after the process block 706, the process 700 may proceed to the idle state at the process block 702. Otherwise, after the process block 706, the process 700 may proceed to the process block 708 for executing the global header search. After the process block 708, the process 700 may return to the process block 704 for storing the header address of a next OSD region into the second memory module 224 of the memory device 204.

Figure 7B:
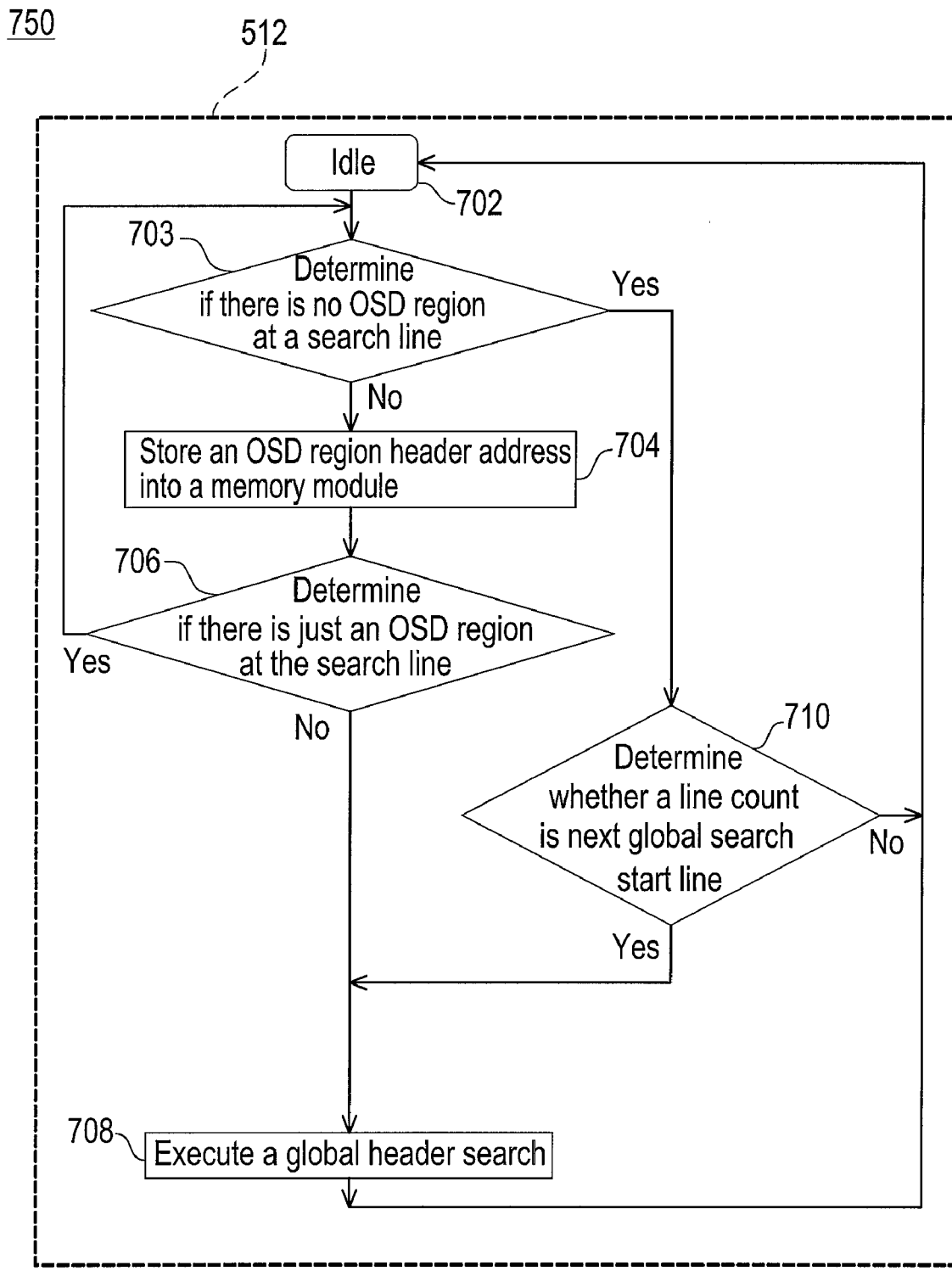
FIG. 7B is a flowchart illustrating a process of storing header addresses of a portion of the OSD regions into a memory module according to another exemplary embodiment.
Figure 8:
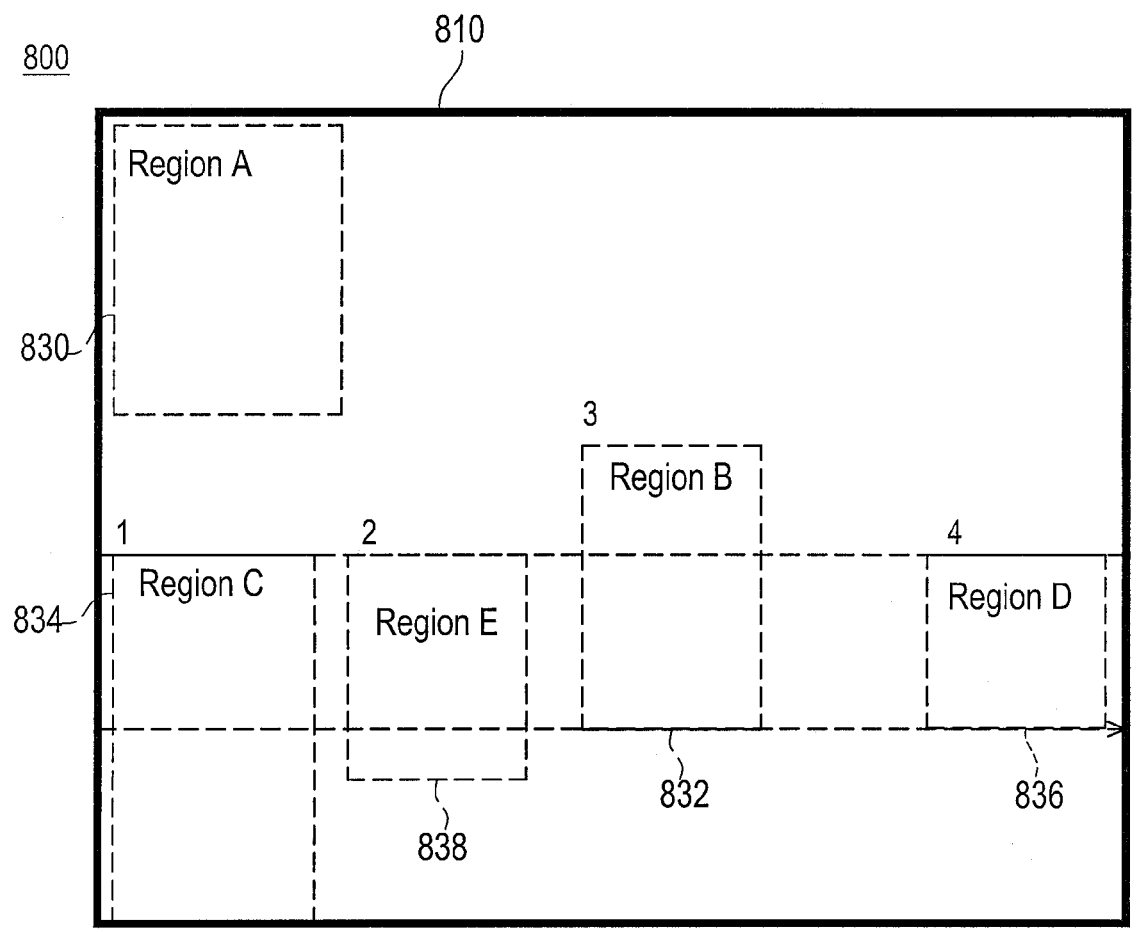
FIG. 8 is a schematic diagram illustrating a process for storing header addresses of multi-region OSD at a search line according to an exemplary embodiment.

FIG. 7B is a flowchart illustrating a process of storing header addresses of a portion of the OSD regions into a memory module according to another exemplary embodiment. Similar to FIG. 7A, FIG. 7B is a sub-process of the process 500 and illustrates the process block 512 in more detail according to another exemplary embodiment. Besides, a process 750 illustrated in FIG. 7B will be described below along with FIG. 8. FIG. 8 is a schematic diagram illustrating a process for storing header addresses of multi-region OSD at a search line according to an exemplary embodiment. Referring to FIG. 8, the main image (not shown) is to be displayed on a screen 810 with multi-region OSD (e.g., a region A 830, a region B 832, a region C 834, a region D 836 and a region E 838) launched in response to the requests from the user. The main image in the present exemplary embodiment could be, for example, a sports event, a movie, or an advertisement video. On the other hand, in the present exemplary embodiment, the region B 832, the region C 834, the region D 836 and the region E 838 happen to be displayed simultaneously on a roughly similar horizontal region.

Referring to FIG. 7B, the process 750 initiates at process block 702 and stays in an idle state. Then the process 750 proceeds to process block 703. At the process block 703, whether there is no OSD region currently at the search line is determined. Such a determination at the process block 703 is to ensure that the global header search skips a case where there is no OSD at the search line such as an empty region between the region A 830 and the region B 832 as illustrated in FIG. 8. If there is currently no OSD region at the search line, then after the process block 703, the process 700 may proceed to process block 710. If there is currently at least an OSD region at the search line, then after the process block 703, the process 750 may proceed to process block 704. The process block 704, the process block 706 and the process block 708 are similar to the corresponding process blocks in the process 700, and the descriptions of the process blocks 704, 706 and 708 will not be repeated here.

At the process block 710, whether there is currently a line count at the search line is next global search start line is determined. If the line count at the search line is the next global search start line, then after the process block 710, the process 700 may proceed to the idle state at the process block 708 for further executing the global header search. Otherwise, after the process block 710, the process 750 may proceed to the process block 702 for returning to the idle state.

In addition to the aforementioned processes 400, 500, 600, 700 and 750, according to an exemplary embodiment of the present invention, there is also provided an efficient way of storing header addresses of the OSD regions into the second memory module 224 of the memory device 204 at the process block 512. Such efficient way of storing header addresses of the OSD regions into the second memory module 224 of the memory device 204 and consecutively transmitting the OSD data for the OSD regions to the mixer 214 will be described in detail below referring to FIG. 8 and FIG. 9.

Referring to FIG. 8, the OSD region B 832, the OSD region C 834, the OSD region D 836 and the OSD region E 838 are sorted according to start y positions and end y positions thereof may be beneficial for a consecutive storing the header addresses of the OSD region B 832, the OSD region C 834, the OSD region D 836 and the OSD region E 838. Besides, the sorting of the OSD region B 832, the OSD region C 834, the OSD region D 836 and the OSD region E 838 may also be beneficial to further output the OSD data of the OSD region B 832, the OSD region C 834, the OSD region D 836 and the OSD region E 838 later on to the mixer 214. Since the region C 834 has a start x position smaller than start x positions of other OSD regions such as the region B 832, the region D 836 and the region E 838, a header address of the region C 834 may be put in a first memory location of the second memory module 224. Similarly, according to start x positions of the region B 832, the region C 834, the region D 836 and the region E 838, these OSD regions are sorted and the header addresses thereof are stored in the second memory module 224 in an order according to the sorting.

Figure 9:
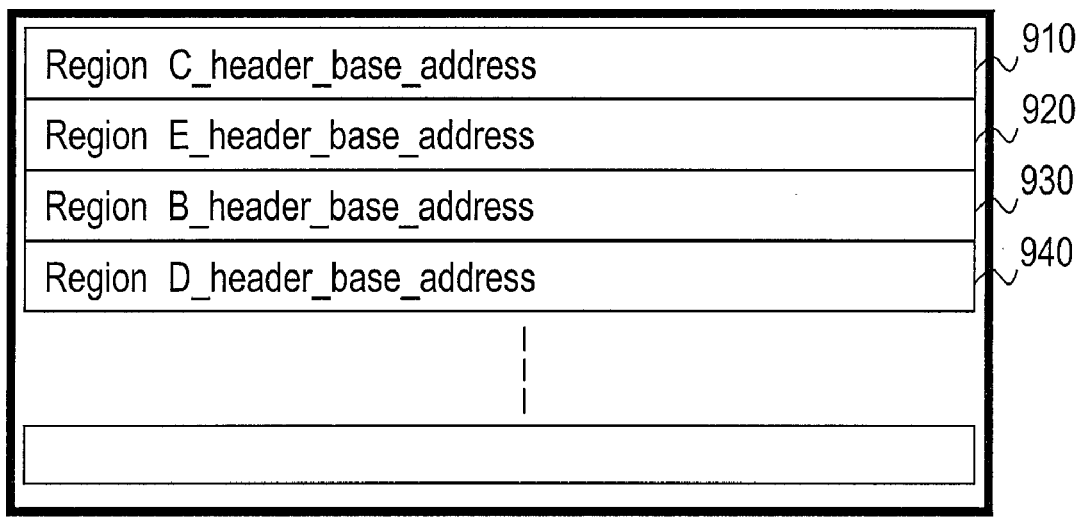
FIG. 9 is a schematic diagram illustrating header addresses of multi-region OSD stored in a memory block of a memory module according to an exemplary embodiment.

FIG. 9 is a schematic diagram illustrating header addresses of multi-region OSD stored in a memory block of a memory device according to an exemplary embodiment. In addition to the order of storing the header addresses of the region B 832, the region C 834, the region D 836 and the region E 838 mentioned previously, in fact, the OSD data for these OSD regions will be later on fetched and further transmitted to the mixer 214 in an identical order starting from the region C 834 to the region D 836. Assuming the OSD data of each the OSD regions such as the region A 830, the region B 832, the region C 834, the region D 836 and the region E 838 is originally stored in the first memory module 222 in a sequential order as "the region A 830→the region B 832→the region C 834→the region D 836→the region E 838." Besides, a storing result of the header addresses of the aforementioned region B 832, the region C 834, the region D 836 and the region E 838 should be in a sequential order like "a region C_header_base_address 910→a region E_header_base_address 920→a region B_header_base_address→a region D_header_base_address 940" as illustrated in FIG. 9. Alternatively, the sorting result is denoted by reference numbers 1, 2, 3 and 4 as illustrated in FIG. 8.

Referring to FIG. 8 and FIG. 9, with a knowledge of the OSD data of the region C 834 is required to be first output to the mixer 214 before the OSD data of the region B 832 in this case, and the header address of the region C 834 is sorted and stored into the second memory module 224 in advance, the OSD data of the region C 834 is output to the mixer 214 without a redundant searching through a header of the region A 830 and the header of the region B 832 in the first memory module 222. Consequently, the method of raster-scan search for multi-region OSD provided in the present exemplary embodiment of the present invention enhances an access speed and a searching efficiency of the OSD data from the memory device 204. In addition to such enhancement in the access speed and the searching efficiency of the OSD data from the first memory module 222 of the memory device 204, the exemplary embodiments of the present invention also reduce memory bandwidth of accessing OSD data from the first memory module 222 of the memory device 204. The reduction of memory bandwidth of accessing OSD data from the memory device 204 will be further described in detail below with an exemplary embodiment referring to FIG. 10 and FIG. 11.

Figure 10:
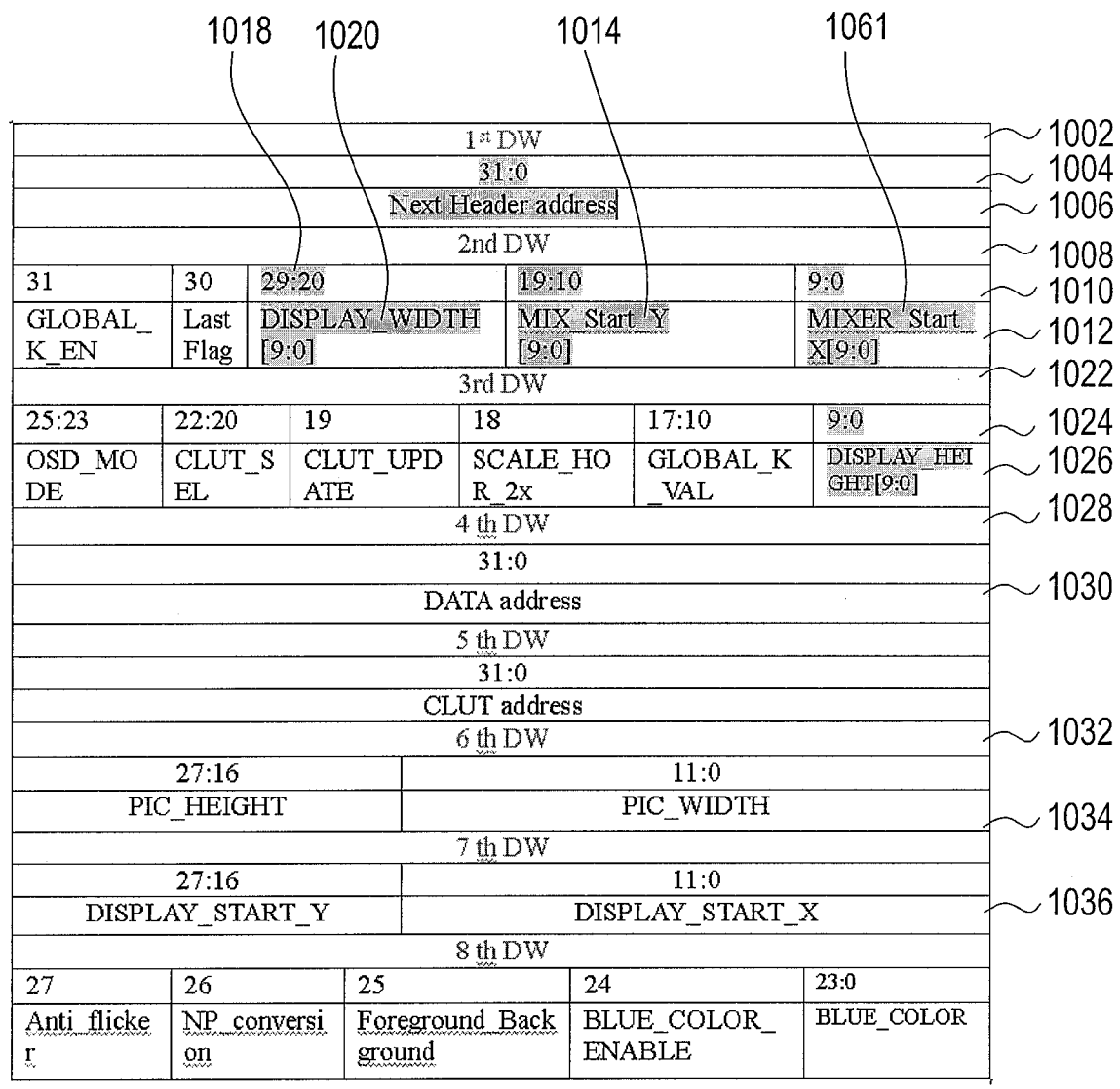
FIG. 10 is a schematic diagram illustrating a registry table storing OSD header data of multi-region OSD according to an exemplary embodiment.

FIG. 10 is a schematic diagram illustrating a registry table storing OSD header data of multi-region OSD according to an exemplary embodiment. Referring to FIG. 10, FIG. 10 is actually an exemplary registry table 1000 for the method of the raster-scan search for the multi-region OSD. The registry table 1000 may include eight double words, and a double word is 32 bits. Besides, referring to FIG. 4 and FIG. 10, in the present exemplary embodiment, the global header search of the OSD regions executed in the memory device 204 (as described in the process block 404) at the search line just requires three double words of information from the registry table. To be more specific, in the present exemplary embodiment, just first three double words are required for the global header search of the OSD regions. Therefore, reference numbers 1028, 1030, 1032, 1034 and 1036 will not be described in details herein since they are not the main focus of the present exemplary embodiment.

Referring to FIG. 10, reference numbers 1002, 1008 and 1022 respectively denotes a first double word, a second double word and a third double word in the registry table. Similarly, reference numbers 1004, 1010, 1018 and 1024 respectively denotes a field containing at least a start bit position and an end bit position of corresponding sections. For example, the reference number 1004 is corresponding to a field with a reference number 1006 (referring to be a next header address), and the next header address should have 32 bits (a bit position starting from 0 to 31) as may be read from a field content of the reference number 1004. To be more specific, in the present exemplary embodiment, the global header search of the OSD regions just requires to fetch information contained in fields corresponding to reference number 1012, 1014, 1020, 1026 and the reference number 1006. In other words, the global header search of the OSD regions just requires to fetch information such as a header address of a next OSD region, a display width of an OSD region currently being searched, a start y position of the OSD region, a start x searching of the OSD region and a display height of the OSD region.

Figure 11:
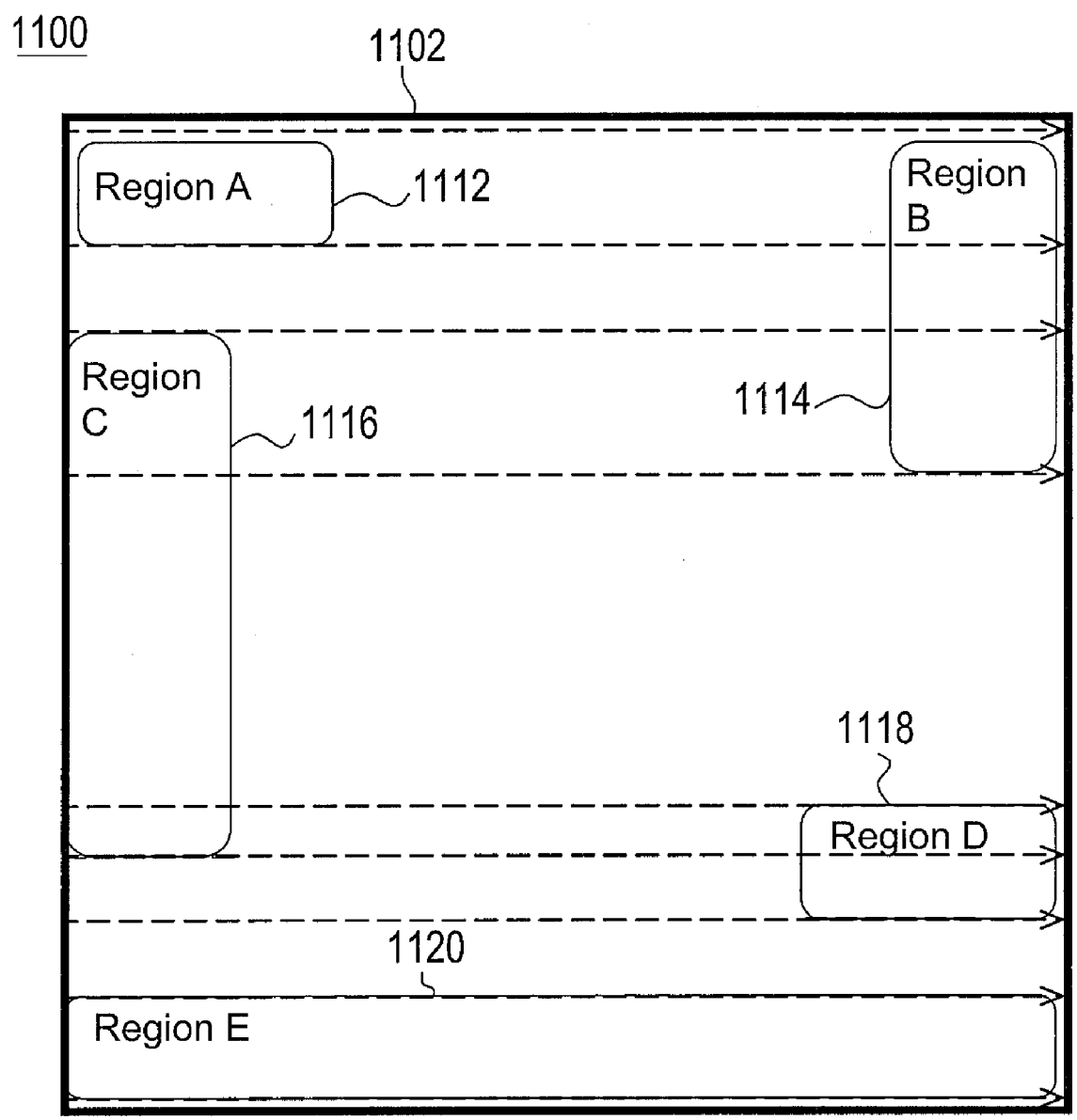
FIG. 11 is a schematic diagram illustrating a process for accessing OSD data of multi-region OSD according to an exemplary embodiment.

FIG. 11 is a schematic diagram illustrating a process for access OSD data of multi-region OSD according to an exemplary embodiment. In the present exemplary embodiment, a screen 1102 with a full resolution of 1,920 pixels by 1,080 pixels includes a region A' 1112, a region B' 1114, a region C' 1116, a region D' 1118 and region E' 1120. The region A' 1112 has 8,000 pixels, the region B' 1114 has 30,000 pixels, the region C' 1116 has 25,000 pixels, the region D' 1118 has 8,000 pixels and the region E' 1120 has 96,000 pixels. Besides, in the present exemplary embodiment, each pixel is assumed to require at least 4 bytes of memory space to record information for the pixel. Furthermore, a frame rate for the screen 1102 is 30 frames per second (fps), and a fresh rate thereof is 0.5. Therefore, in a case where no raster-scan search for the multi-region OSD or the global header search is implemented, memory bandwidth required for the multi-region OSD (i.e., the region A' 1112, the region B' 1114, the region C' 1116, the region D' 1118 and the region E' 1120) to be displayed in the screen 1102 of FIG. 11 is approximately 124.416 mega bits per second (MB/s). On other hand, if any of the methods of raster-scan search for the multi-region OSD as illustrated in FIG. 4, FIG. 5 and FIG. 6 is applied for the multi-region OSD to be displayed in the screen 1102, a total memory bandwidth required for searching the OSD regions and accessing the OSD data later on may be reduced to approximately 10.2 MB/s. As may be seen from the aforementioned description, in the present exemplary embodiment, the method of the raster-scan search for the multi-region OSD may achieve a saving on the memory bandwidth slightly more than 90% when searching the OSD regions and accessing the OSD data.

According to an exemplary embodiment of the present invention, the present invention also provides a raster-scan search system 300 for the multi-region OSD, and the raster-scan search system 300 will be further described in detail below. The raster-scan search system 300 may be implemented in the OSD region processing unit 210. Referring to FIG. 3, in the present exemplary embodiment, the OSD region processing unit 210 includes the global header search module 310, the dummy region determination module 352, the OSD header address storing module 354, the blending region data output module 360, a search line judgment module 372, a boundary line judgment module 374, a search line end determination module 376, a processor module 382 and a memory module 384. The global header search module 310, the dummy region determination module 352, the OSD header address storing module 354 and the blending region data output module 360 are briefly described previously but they will be further described in more detail below.

Referring to FIG. 3, the global header search module 310 includes a blending region information extractor 320, a next global search start line locator 330 and a start OSD region locator 340. The blending region information extractor 320 is configured for finding the blending region information. Besides, the next global search start line locator 330 is configured for finding the next global search start line. In addition, the start OSD region locator 340 is configured for finding the start OSD region at the search line.

Referring to FIG. 3, the blending region information extractor 320 includes a blending region coordinate locator 322. The blending region coordinate locator 322 is configured for searching the start x position, the start y position, the end x position, and the end y position of the OSD regions in the blending region.

Referring to FIG. 3, the next global search start line locator 330 includes an OSD region sorter module 332 and a next global search start line locator 334. The OSD region sorter module 332 is configured for sorting the start y positions and the end y positions of the OSD regions. Moreover, the next global search start line locator 334 is configured for finding the next global search start line according to the sorted start y position and the end y position of the OSD regions.

Referring to FIG. 3, the OSD header address storing module 354 is further configured for storing v OSD header addresses of the v OSD regions at the search line into the second memory module 224 of the memory device 204, and the aforementioned parameter v is a positive integer less than or equal to h, and the OSD data of the v OSD regions at the search line is accessed according to the v OSD header addresses of the v OSD regions stored in the second memory module 224. Besides, the OSD header address storing module 354 is also configured for storing the v OSD header addresses of the v OSD regions at the search line into the second memory module 224 in an order identical to an order of the v OSD regions at the search line.

The blending region data output module 360 also includes an OSD data fetcher module 362, a dummy region data output module 364 and an OSD data output module 366. The OSD data fetcher module 362 is configured for accessing the OSD data of the OSD regions at the search line from the first memory module 222 of the memory device 204. Furthermore, the OSD data of the h OSD regions at the search line is accessed according to the OSD headers of the h OSD regions at the search line, and the dummy region is calculated according the OSD headers of the h OSD regions at the search line. Besides, the OSD data fetcher module 362 is also configured for. Moreover, the OSD data fetcher module 362 is further configured for fetching the OSD data of the OSD regions from the first memory module 222. There are at least two OSD header addresses of the OSD regions stored in the second memory module 224 of the memory device 204. The OSD data of the two OSD regions are read according to the two read OSD header addresses, and an order of reading the two read OSD header addresses is identical to an order how the two OSD header addresses are stored into the second memory module 224.

The dummy region data output module 364 is configured for transmitting the alpha value for the dummy region and transmitting the dummy data of the dummy region to the mixer 214, and the alpha value for the dummy region is configured to be zero before being transmitted to the mixer 214. Besides, the dummy region data output module 364 just transmits the dummy data of the dummy region and the alpha value to the mixer when a dummy period at the search line is equal to a true value, and the dumpy period is used to present whether a current pixel point is on the dummy region, and the alpha value is set to be zero. Furthermore, the dummy region data output module 364 just transmits the OSD data of the OSD region to the mixer 214 when a dummy period at the search line is equal to a false value.

The OSD data output module is configured for transmitting the OSD data of the OSD regions to the mixer 214, and the OSD data is transmitted to the mixer 214 in an order identical to an order how the header addresses of the OSD regions are stored in the second memory module 224.

Referring to FIG. 3, the global header search module 310 is configured for executing at least (v−1) times of the global header search after the first executed global header search of the OSD regions in the first memory module 222 of the memory device 204, so as to find the (v−1) OSD header addresses of the (v−1) OSD regions at the search line to be stored into the second memory module 224 of the memory device 204. The global header search module 310 is also configured to execute the global header search in response to at least an OSD region existing at the search line. Besides, the global header search module 310 is further configured for updating the alpha-blending positions to the mixer 214, and the alpha-blending positions comprise the start x position, the start y position, the end x position and the end y position of the blending region. Moreover, the global header search module 310 is further configured for executing the global header search of the OSD regions in the first memory module 222 of the memory device 204 in response to the search line of the global header search being determined to be the boundary line. Furthermore, the search line end determination module 376 is configured for determining whether the current pixel position at the search line to be processed is the end of the search line after the blending region data output module 360 transmits the OSD data of the OSD regions to the mixer 214.

Referring to FIG. 3, the search line judgment module 372 is configured for determining whether the search line of the global header search is the next global search start line. Besides, the boundary line judgment module 374 is configured for determining whether the search line of the global header search is a boundary line in response to the search line of the global header search being determined to be the next global search start line. Furthermore, the OSD data fetcher module 362 is further configured for fetching the OSD data of at least two OSD regions from the first memory module 222 in response to the current pixel position at the search line being determined to be not the end of the search line after the blending region data output module transmits the OSD data of the OSD regions to the mixer 214. In addition, the OSD data fetcher module 362 is also configured for fetching the OSD data of at least two OSD regions from the first memory module 222 in response to the search line of the global header search being determined to be not the next global search start line.

Referring to FIG. 3, the OSD data fetcher module 362 is also configured for fetching the OSD data of at least two OSD regions from the first memory module 222 of the memory device 204 in response to the current pixel position at the search line being determined to be not the end of the search line after the blending region data output module 360 transmits the OSD data of the OSD regions to the mixer 214. Besides, the OSD data fetcher module 362 is further configured for fetching the OSD data of at least two OSD regions from the first memory module 222 of the memory device 204 in response to the current search line of the global header search being determined to be not the next global search start line.

The dummy region determination module 352 is further configured for determining whether there is a dummy region at the search line according to the two read OSD headers of the OSD regions. The dummy region determination module 352 is further configured for determining whether there is a dummy region at the search line in response to the current pixel position at the search line being determined to be not the end of the current search line after the blending region data output module 360 transmits the OSD data of the OSD regions to the mixer 214.

Referring to FIG. 3, the processor module 382 is configured to execute and coordinate the global header search module 310, the dummy region determination module 352, the OSD header address storing module 354, the blending region data output module 360, the search line judgment module 372, the boundary line judgment module 374 and the search line end determination module 376. In addition, the memory module 384 is configured to store temporary information for above-described searching, sorting, storing, comparison, judgment, and determination tasks conducted by the global header search module 310, the dummy region determination module 352, the OSD header address storing module 354, the blending region data output module 360, the search line judgment module 372, the boundary line judgment module 374 and the search line end determination module 376.

In summary, the exemplary embodiments of the present invention provide a method of raster-scan search for multi-region OSD and a system using the same. The method of raster-scan search for multi-region OSD executes the global header search of the OSD regions in the memory device, determines whether there is a dummy region at the search line, and transmits the OSD data of the OSD region, the alpha value for the dummy region and the dummy data for the dummy region to the mixer for the alpha-blending so as to display the multi-region OSD along with the main image on the screen. Accordingly, exemplary embodiments of the present invention may improve searching efficiency, increase access speed and reduce memory bandwidth for accessing the OSD data from the memory device, thereby enhancing performance of searching and accessing the OSD data on the memory device.

Although the present invention has been disclosed above by the embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A method of raster-scan search for multi-region On-Screen Display (OSD), wherein the multi-region OSD is to be displayed on a screen after an alpha-blending of a mixer, the method comprising:
   executing a global header search in a first memory module for each or a portion of a plurality search lines, wherein the first executed global header search of OSD regions in the first memory module is used to determine a blending region and to store header addresses of the OSD regions in a second memory module;
   determining a dummy region at the search line; and
   transmitting an alpha value for the dummy region, a dummy data of the dummy region, and OSD data of h OSD regions at the search line to the mixer when a dummy region at the search line is determined, wherein h is the number of the OSD regions at the search line.

2. The method as claimed in claim 1, wherein the dummy region is calculated according OSD headers of h OSD regions at the search line.

3. The method as claimed in claim 1, wherein the step of executing the global header search of the OSD regions in the first memory module to determine the blending region comprises:
   finding blending region information;
   finding a next global search start line; and
   finding a start OSD region at the search line.

4. The method as claimed in claim 3, wherein the step of finding the next global search start line comprises:
   sorting start y positions and end y positions of the OSD regions; and
   finding the next global search start line according to the sorted start y positions and end y positions of the OSD regions.

5. The method as claimed in claim 3, wherein the step of finding the blending region information comprises:
   searching a start x position, a start y position, an end x position, and an end y position of the blending region among start x positions, start y positions, end x positions, and end y positions of the headers of the OSD regions in the blending region.

6. The method as claimed in claim 2, wherein the step of determining whether there is a dummy region at the search line comprises:
   reading at least two OSD header addresses of the OSD regions stored in the second memory module, wherein an order of reading the two OSD header addresses is identical to an order how the two OSD header addresses are stored into the second memory module;
   fetching the OSD data of the two OSD regions according to the two read OSD header addresses; and
   determining whether there is a dummy region at the search line according to the two read OSD headers of the OSD regions.

7. The method as claimed in claim 1, wherein the step of transmitting the alpha value for the dummy region, the dummy data of the dummy region, and the OSD data of the h OSD regions at the search line to the mixer, comprises:
   when a dummy period at the search line is equal to a true value, transmitting the dummy data of the dummy region and the alpha value to the mixer, wherein the dumpy period is used to present whether a current pixel point is on the dummy region, and the alpha value is set to be zero; and
   when a dummy period at the search line is equal to a false value, transmitting the OSD data of the OSD region to the mixer.

8. The method as claimed in claim 1, wherein the step of executing the global header search of the OSD regions in the first memory module to determine the blending region further comprises:
   updating alpha-blending positions to the mixer, wherein the alpha-blending positions comprise the start x position, the start y position, the end x position and the end y position of the blending region.

9. The method as claimed in claim 1, wherein after the step of transmitting the OSD data of the OSD regions to the mixer, the method further comprises:
   determining whether a current pixel point of the search line is an end of the search line; and
   fetching the OSD data of at least two OSD regions from the first memory module when the current pixel point of the search line is not the end of the search line, and
   proceeding to the step of determining whether there is a dummy region at the search line when the current pixel point of the search line is the end of the search line.

10. The method as claimed in claim 2, wherein the method further comprises:
    determining whether a line count is the next global search start line; and
    returning to the step of executing the global header search in the first memory module for the next search line when the line count is the next global search start line, wherein the line count is a boundary line, and
    fetching the OSD data of at least two OSD regions from the first memory module when the line count is not the next global search start line.

11. A raster-scan system for multi-region On-Screen Display (OSD), wherein the multi-region OSD is to be displayed on a screen after an alpha-blending of a mixer, wherein OSD headers and OSD data of a plurality of OSD regions are stored in a first memory module, and the mixer executes the alpha-blending of the OSD data from the raster-scan search system for the multi-region OSD and a main image data from a main image processing unit, the raster-scan search system comprising:
    a global header search module, configured for executing a global header search in the first memory module for each or a portion of a plurality of search lines, used to determine a blending region and to store header addresses of the OSD regions in a second memory module;
    a dummy region determination module configured for determining a dummy region at the search line;
    a blending region data output module configured for transmitting an alpha value for the dummy region, a dummy data of the dummy region, and the OSD data of the h OSD regions at the search line to the mixer when a dummy region at the search line is determined, wherein h is the number of the OSD regions at the search line; and
    a processor configured to execute and to coordinate the global header search module, the dummy region determination module, and the blending region data output module.

12. The raster-scan search system as claimed in claim 11, wherein the blending region data output module comprises an OSD data fetcher module configured for accessing the OSD data of the OSD regions at the search line from the first memory module, wherein the OSD data of the h OSD regions at the search line is accessed according to the OSD headers of the h OSD regions at the search line, and the dummy region is calculated according the OSD headers of the h OSD regions at the search line.

13. The raster-scan search system as claimed in claim 11, wherein the global header search module comprises:

a blending region information extractor configured for finding blending region information;

a next global search start line locator configured for finding a next global search start line; and a start OSD region locator configured for finding a start OSD region at the search line.

14. The raster-scan search system as claimed in claim 13, wherein the next global search start line locator comprises:

an OSD region sorter module configured for sorting start y positions and end y positions of the OSD regions; and a next global search start line locator configured for finding the next global search start line according to the sorted start y positions and end y positions of the OSD regions.

15. The raster-scan search system as claimed in claim 13, wherein the blending region information extractor comprises:

a blending region coordinate locator configured for searching a start x position, a start y position, an end x position, and an end y position of the headers of the OSD regions in the blending region.

16. The raster-scan search system as claimed in claim 12, wherein the OSD data fetcher module is further configured for fetching the OSD data of the OSD regions from the first memory module, wherein at least two OSD header addresses of the OSD regions are stored in the second memory module, the OSD data of the two OSD regions are read according to the two read OSD header addresses, and an order of reading the two read OSD header addresses is identical to an order how the two OSD header addresses are stored into the second memory module.

17. The raster-scan search system as claimed in claim 16, wherein the raster-scan search system further comprises a dummy region determination module configured for determining whether there is a dummy region at the search line according to the two read OSD headers of the OSD regions.

18. The raster-scan search system as claimed in claim 12, wherein the blending region data output module further comprises:

a dummy region data output module configured for transmitting the alpha value for the dummy region and transmitting the dummy data of the dummy region to the mixer, wherein the alpha value for the dummy region is configured to be zero before being transmitted to the mixer; and an OSD data output module configured for transmitting the OSD data of the OSD regions to the mixer, wherein the OSD data is transmitted to the mixer in an order identical to an order how the header addresses of the OSD regions are stored in the second memory module.

19. The raster-scan search system as claimed in claim 12, wherein the raster-scan search system further comprises:

a search line end determination module configured for determining whether a current pixel point of the search line is an end of the search line after the blending region data output module transmits the OSD data of the OSD regions to the mixer.

20. The raster-scan search system as claimed in claim 13, wherein the raster-scan search system further comprises:

a search line judgment module configured for determining whether a line count is the next global search start line, and a boundary line judgment module configured for determining whether the line count is a boundary line in response to the line count being the next global search start line.

* * * * *